US007219088B1

(12) United States Patent
Li (10) Patent No.: US 7,219,088 B1
(45) Date of Patent: May 15, 2007

(54) METHOD AND SYSTEM FOR ANALYZING CHARACTER DATA

(75) Inventor: Warren Xiaohui Li, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 575 days.

(21) Appl. No.: 10/158,174

(22) Filed: May 29, 2002

(51) Int. Cl.
*G06F 17/30* (2006.01)

(52) U.S. Cl. .................................. 707/1; 707/104.1

(58) Field of Classification Search ............. 707/1–10, 707/100–104.1, 200–206; 341/90.55, 90; 715/536

See application file for complete search history.

(56) References Cited

U.S. PATENT DOCUMENTS

| 5,940,845 | A | * | 8/1999 | Prager et al. ............... 715/536 |
| 5,963,155 | A | * | 10/1999 | Cheng et al. ................. 341/90 |
| 6,204,782 | B1 | * | 3/2001 | Gonzalez et al. ............. 341/90 |
| 6,400,287 | B1 | * | 6/2002 | Ehrman ....................... 341/55 |
| 6,701,320 | B1 | * | 3/2004 | Marple ....................... 707/100 |
| 6,829,620 | B2 | * | 12/2004 | Hsing et al. ............. 707/104.1 |

* cited by examiner

*Primary Examiner*—Yicun Wu (57) ABSTRACT

A method for analyzing character data. In one method embodiment, the present invention partitions a portion of the character data into a first group of character data strings based on a fixed byte-width property of the character data strings. Additionally, a portion of the character data is partitioned into a second group of character data strings based on a variable byte-width property of the character data strings. The first group of character data strings is then processed utilizing a fixed byte-width character data string process. Furthermore, the second group of character data strings is processed utilizing a variable byte-width character data string process. In so doing, the execution of the fixed byte-width character data string process is more efficient than the execution of the variable byte-width character data string process.

28 Claims, 8 Drawing Sheets

METHOD AND SYSTEM FOR ANALYZING CHARACTER DATA

FIELD OF THE INVENTION

The present invention relates to the field of data analysis. Specifically, the present invention relates to string operations performed on character data.

BACKGROUND ART

In the growing world market environment, the need for globalization of applications has become a necessity. That is, as the world markets are united in an electronic marketplace and businesses compete in the world market, a single representative character encoding environment is needed for global character data string processing. For example, in order to ensure the ability of a company to operate utilizing multiple languages, such as English and Chinese, a coding system that can work with almost all of the world's language character sets, is desired.

Presently, there are many types of character encoding environments utilized in character data string processing. For example, the most widely used encoding environment in the United States of America is American standard code for information interchange (ASCII). While in Europe, the character encoding environment Western Europe 8 (WE8DEC) is utilized.

Both character encoding environments (i.e. ASCII and WE8DEC) utilize a single byte per character (8 bits). Therefore, 256 different characters may be represented by either character encoding environment. In the English language, and most European languages, 256 character representations are more than enough to cover most, if not all, of the possible characters of the language. However, in many Asian countries, for example Japan and China, there are many more than 256 characters. Thus, a single byte character encoding environment is not large enough to represent the language. In fact, due to the amount of Chinese characters, an environment of up to four bytes per character (32 bits) may be required to adequately depict the language.

To solve the problems of a worldwide applicable character set, a globalization character encoding system (Unicode) has been developed by Unicode Consortium. In general, Unicode provides a unique number for every character, regardless of platform, program, or language. The Unicode standard has been adopted by many industry leaders. There are two types of Unicode encoding character sets used for different situations. One is a fixed-width encoding character set such as UTF16, UTF32, and the like. The other is a variable-width encoding character set such as UTF8, and the like.

The fixed-width character sets such as UTF16, UTF32, and the like, require a fixed amount of bits to represent each character. For example, UTF16 requires 2 bytes (16 bits) and UTF32 requires 4 bytes (32 bits). These character sets are suitable for Asian languages. One advantage of the fixed-width character set is that string operations can be very efficient. For example, in a UTF16 character set, a data string that has 66 bytes is immediately recognized as having 33 characters.

However, characters in the variable-width character set UTF8 may be represented by one, two, or three bytes. One significant advantage of UTF8 is that ASCII is a subset of UTF8 encoding. Therefore, any data used in an ASCII environment can be directly used in UTF8 without any migration effort. Another advantage is that it is very suitable to the mixed language environment where the majority of data is ASCII. In such an environment, the majority of ASCII data will be represented as one byte per character.

In contrast, the fixed-width encoding character sets such as UTF16 and UTF32 require that each ASCII character be stored within multiple bytes which may cause a deleterious drain on system resources. Therefore, for storage requirements for the ASCII data will be much smaller when stored in UTF8. Due to the above stated requirements, UTF8 has been widely adopted in the mixed language environments.

SUMMARY OF INVENTION

The present invention provides, in various embodiments, a method and system for analyzing character data. Furthermore, the present invention provides a method and system for analyzing character data and partitions the character data string into either single-byte character data string or multi-byte data. Additionally, the present invention provides a method and system for analyzing character data faster and less expensively.

Specifically, in one embodiment, the present invention partitions a portion of the character data into a first group of character data strings based on a fixed byte-width property of the character data strings. Additionally, a portion of the character data is partitioned into a second group of character data strings based on a variable byte-width property of the character data strings. The first group of character data strings is then processed utilizing a fixed byte-width character data string process. Furthermore, the second group of character data strings is processed utilizing a variable byte-width character data string process. In so doing, the execution of the fixed byte-width character data string process is more efficient than the execution of the variable byte-width character data string process.

For example, in one embodiment, the present invention may reduce the processing time by selectively processing the character data strings within the character data groups. That is, when a character data string is accessed, if the data string is a variable or unknown byte-width string of data, a normal slower process of variable byte-width analysis may be used. However, if the character data string is a fixed byte-width character data string, then a more efficient fixed byte-width engine can be used.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within an electronic computing device and/or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "partitioning", "receiving", "processing", "creating", "storing", "delivering", "accessing", "generating", "providing", "separating", "outputting", "performing", "marking" or the like, refer to the action and processes of a computer system, or similar electronic computing device, that manipulates and transforms data. The data is represented as physical (electronic) quantities within the computing device's registers and memories and is transformed into other data similarly represented as physical quantities within the computing device's memories or registers or other such information storage, transmission, or display devices.

Overview

Figure 1:
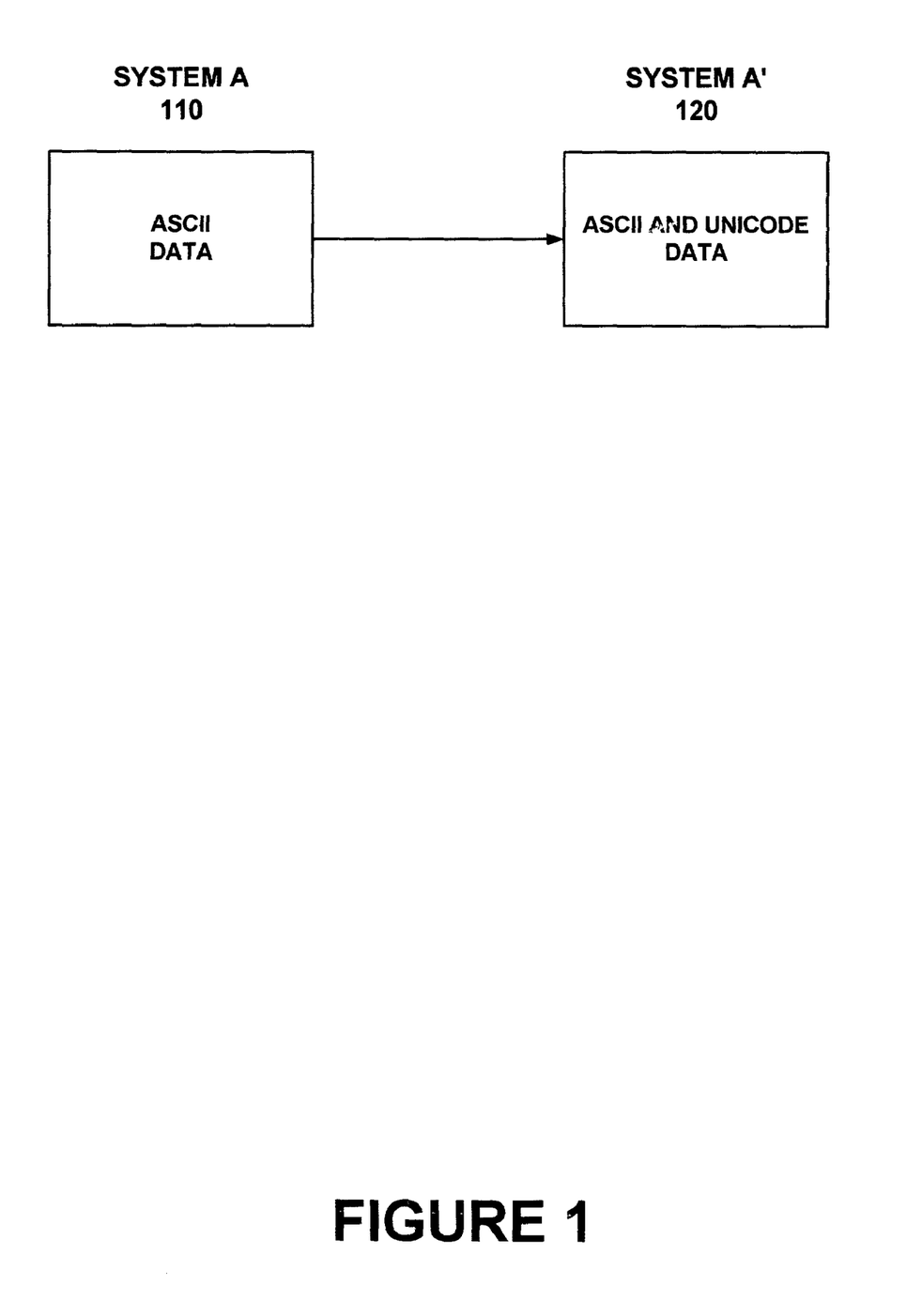
FIG. 1 is a block diagram of an embodiment of an exemplary partitioning of character data in accordance with an embodiment of the present invention.

FIG. 1 is a block diagram of an embodiment of an exemplary partitioning of character data in accordance with an embodiment of the present invention. Specifically, FIG. 1 shows a system A 110 that is comprised of American character standard ASCII data which is widely used in American language environments. FIG. 1 further shows system A' 120 that is comprised of a combination of ASCII and non-ASCII Unicode data (e.g., Unicode UTF8 of which ASCII is a subset). System A' 120 is widely used for the globalization task.

Figure 2A:
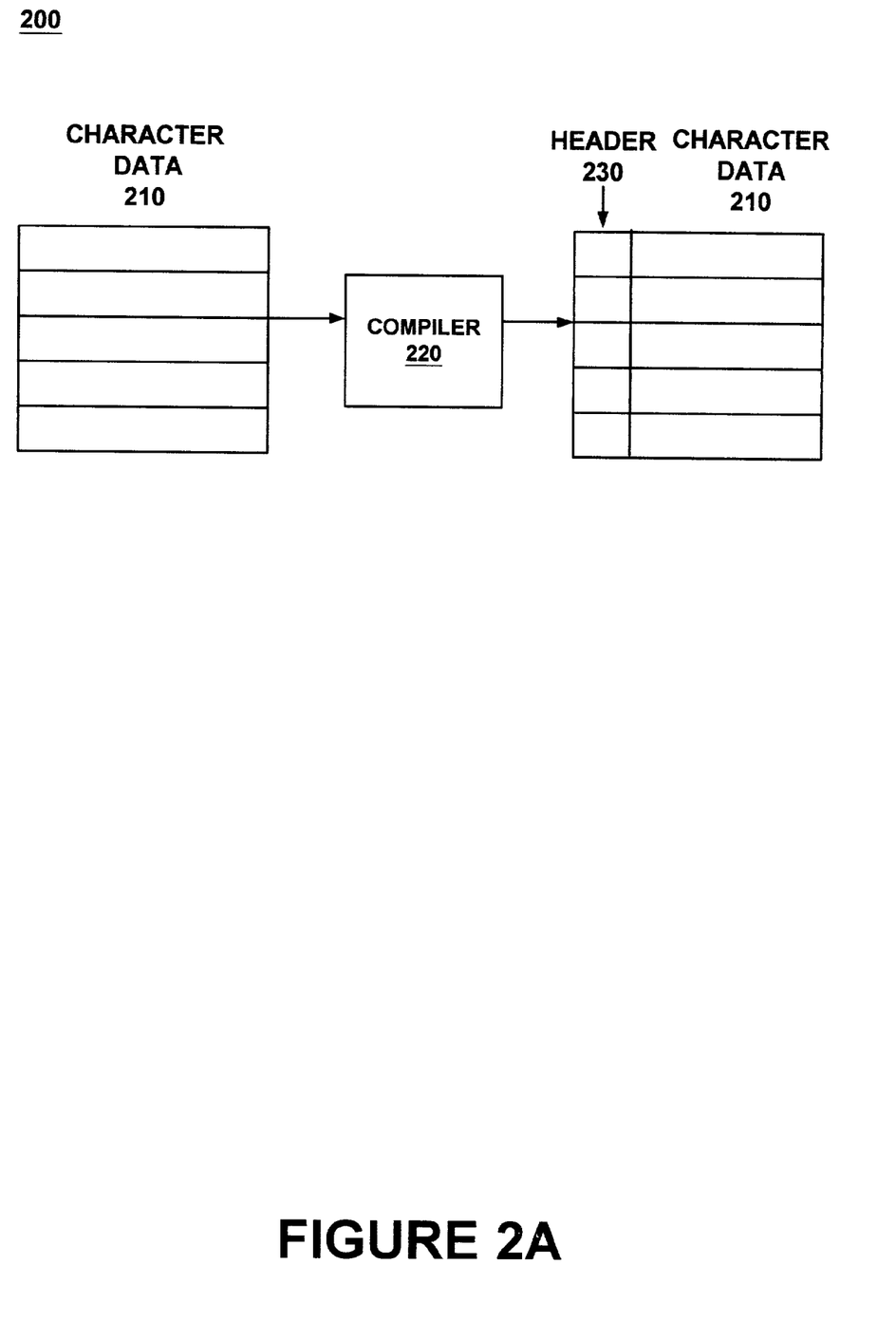
FIGS. 2A–2B are block diagrams of exemplary methods for performing partitioning of character data in accordance with embodiments of the present invention.
Figure 2B:
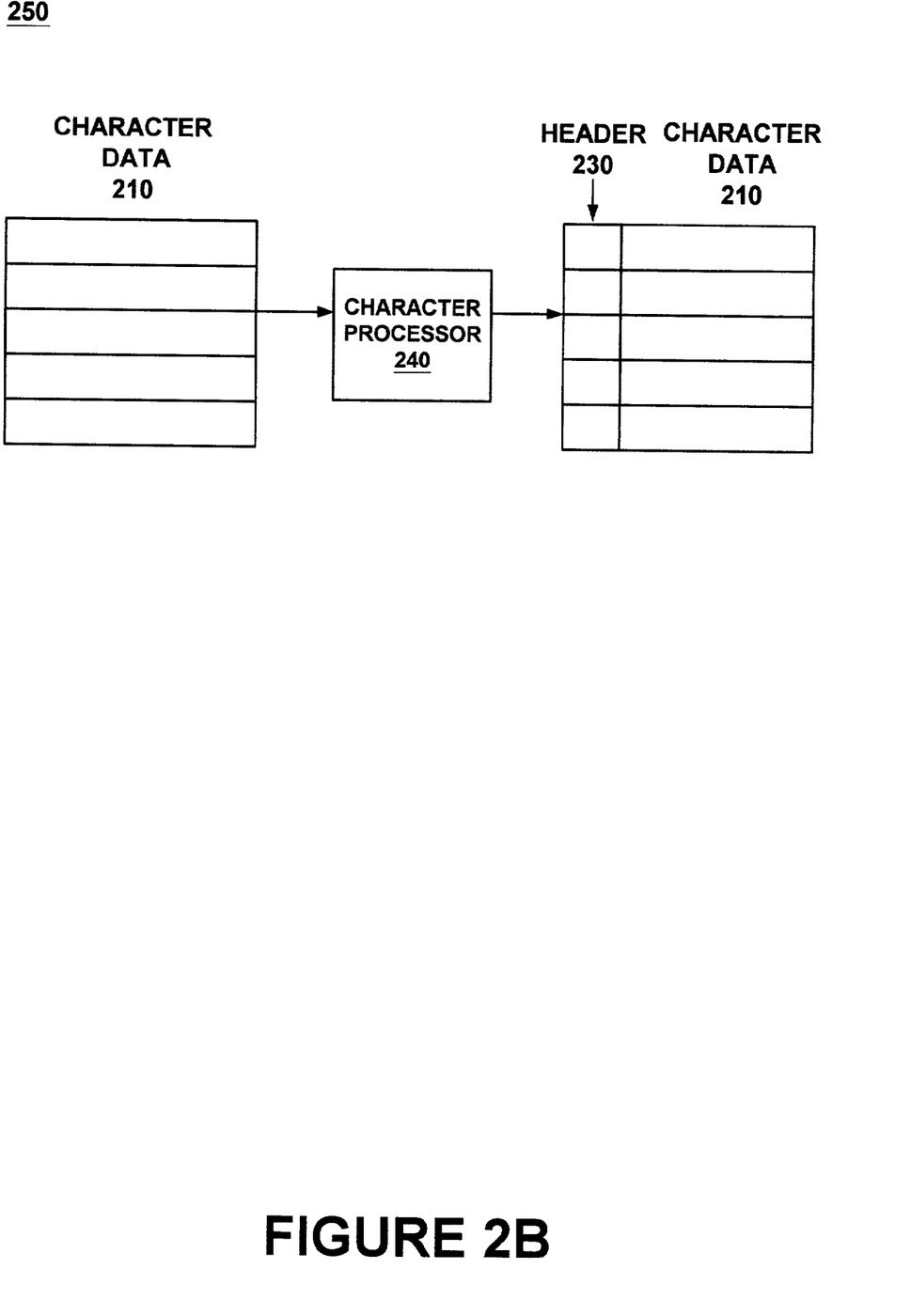
Figure 3:
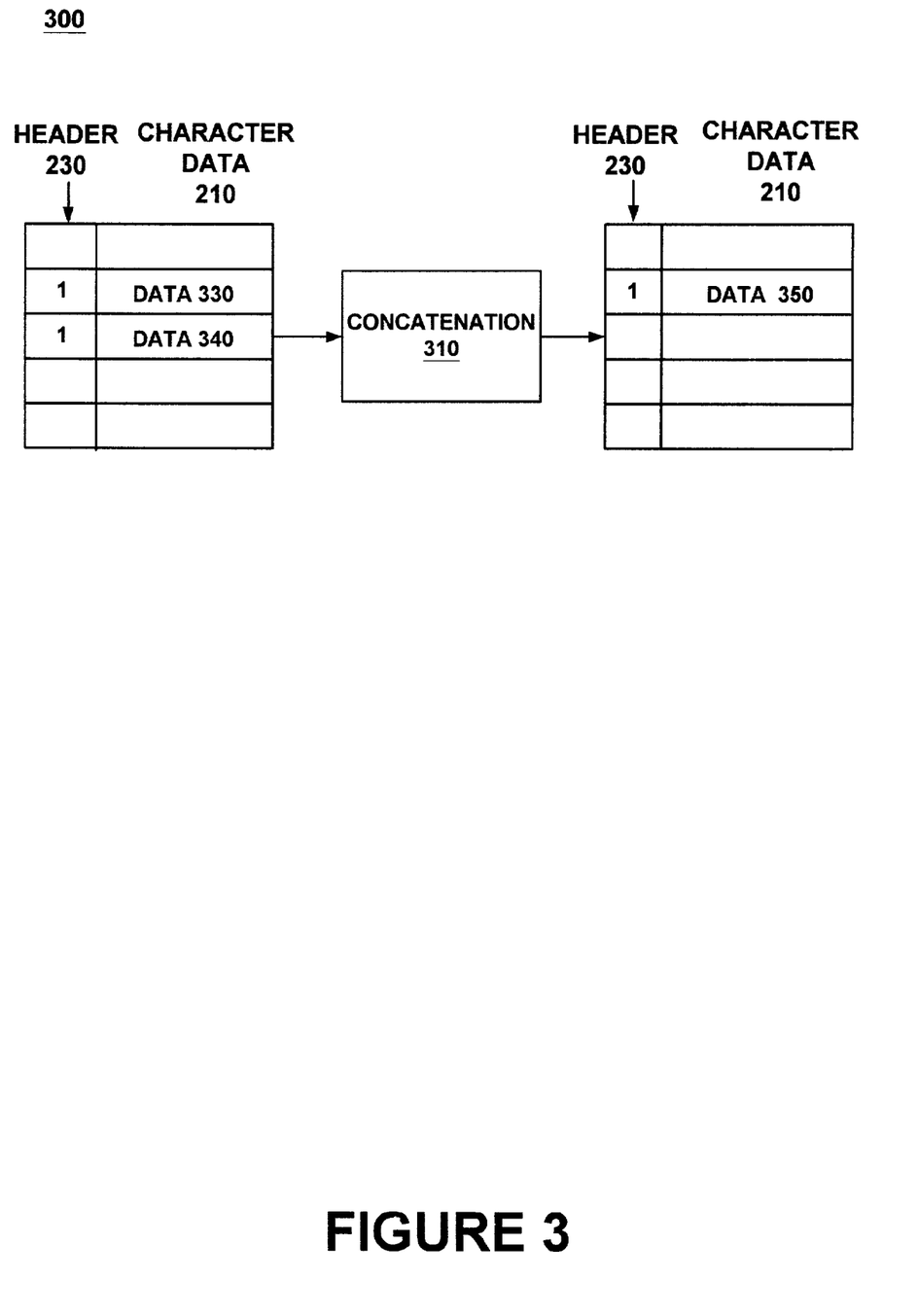
FIG. 3 is a block diagram of an exemplary method for performing concatenation of character data in accordance with an embodiment of the present invention.

In the present embodiment, as shown in FIGS. 2A–2B and FIG. 3, character data 210 may be comprised of data strings in a format such as system A' 120. That is, initially character data 210 may be a combination of both ASCII and Unicode data. Furthermore, the data strings within character data 210 may contain no byte-width information. Thus in order to search the character data string for specific combinations of characters, a character data string engine may be required to search each byte in the data string. This process is extremely time consuming, and can require large amounts of processing power.

In order to reduce the processing time, the present invention organizes the character data strings within the character data into two groups. A variable byte-width group and a fixed byte-width group. Thus, when a character data string is accessed, it may contain fixed, variable, or unknown byte-width data. If the data string is a variable or unknown byte-width string of data, a normal slower process of variable byte-width analysis may be used. However, if the character data string is a fixed byte-width character data string, then a more efficient fixed byte-width engine may be used. Upon analysis, the data string within character data 210 may be assigned a header 230. Header 230 may be a bit, combination of bits, or other type of data string marking method which allows the data string within character data 210 to be identified and/or grouped.

The organization of the character data strings into variable byte-width groups and fixed byte-width groups can occur prior to run-time for the character set. For example, the analysis may occur during compilation. Additionally, the organization of the character data strings into variable byte-width groups and fixed byte-width groups may be an ongoing process. That is, the analysis may continue throughout the life of the database. For example, when a data string is accessed the first time, it may not contain any information regarding the byte-width of the string. Therefore, the initial analysis treats the data string as a variable byte-width character data string. However, upon completion of the analysis, the data string may then be labeled as either fixed or variable byte-width. Thus, each time the database is accessed, the amount of labeled data strings may grow while the amount of unlabeled or unknown byte-width data strings may decrease.

Utilization

As shown in FIGS. 2A–2B and FIG. 3, the possible methods for analyzing the data strings within character data 210 may be, but are not limited to, a compiler 220, a character processor 240, concatenation 310, or the like, which may be utilized to perform an analysis of character data 210. Additionally, upon analysis a header 230 may be applied to the character data string (e.g., data string 350). Furthermore, the analysis of the data strings within character data 210 may occur during compilation by a compiler 220, after compilation by a character processor 240, during run-time by character processor 240, and/or during a mathematical concatenation 310 of two or more strings of data such as data 330 and 340.

With reference now to FIG. 2A, a block diagram of an exemplary method for performing partitioning of character data 210 is shown in accordance with an embodiment of the present invention. Specifically, FIG. 2A shows the partitioning of character data 210 utilizing a compiler 220. As stated herein, compiler 220 may be utilized to partition character data 210 into fixed byte-width data strings and variable byte-width data strings. The use of compiler 220 to partition character data 210 allows the partitioning to be performed prior to run-time. Thus, the analysis of character data 210 is completed prior to consumer utilization and therefore does not interfere with, slow down, or otherwise adversely effect, any system that may utilize character data 210 in the future.

The partitioning of character data 210 may be performed by separating the character data 210 into groups, wherein one group is fixed byte-width data strings and another group is variable byte-width data strings. In another embodiment, the partitioning of character data 210 may be performed by adding a header 230 to a data string within character data 210. For example, a header 230 may be added to a data string within character data 210 to identify the data string as either variable byte-width or fixed byte-width.

With reference now to FIG. 2B, a block diagram of an exemplary method for performing partitioning of character data 210 is shown in accordance with another embodiment of the present invention. Specifically, FIG. 2B shows the partitioning of character data 210 utilizing a character processor 240. As stated herein, character processor 240 may be a software application utilized to partition character data 210 into fixed byte-width data strings and variable byte-width data strings. The use of character processor 240 to partition character data 210 allows the partitioning to be performed during run-time. For example, character processor 240 may be utilized to partition character data 210 during periods of inactivity such as during standby, while the system is in a low power mode, during times of little use, or the like, when character processor 240 may otherwise be underutilized.

In another embodiment, character processor 240 may be utilized to partition character data 210 during an unrelated access of character data 210. For example, if the system is searching character data 210 for a data string, upon analysis of a data string, character processor 240 may identify the data string as either a fixed byte-width or variable byte-width data string. Thus, the analysis of character data 210 may be completed during required processing, and therefore may not interfere with, slow down, or otherwise adversely effect the operations of the system utilizing character data 210. The use of character processor 240 to partition character data 210 is very efficient during times of unrelated access, in fact, the partitioning of character data 210 by character processor 240 may be performed during periods of heavy unrelated activity with little detrimental effect. Further description of this process is described in more detail herein.

As stated above, the partitioning of character data 210 may be performed by separating the character data 210 into groups, wherein one group is fixed byte-width data strings and another group is variable byte-width data strings. In another embodiment, the partitioning of character data 210 may be performed by adding a header 230 to a data string within character data 210. For example, a header 230 may be added to a data string within character data 210 to identify the data string as either variable byte-width or fixed byte-width.

With reference now to FIG. 3, block diagram of an exemplary method for performing concatenation of character data 210 in accordance with an embodiment of the present invention is shown. Specifically, concatenation 310 may be a software application used for linking structures together. For example, concatenating a data string appends one (or a portion of one) data string to another (or a portion of another) data string. As stated herein, concatenation 310 may be utilized to further partition character data 210 into fixed byte-width data strings and variable byte-width data strings. Specifically, the use of concatenation 310 to further partition character data 210 allows the combination of multiple portions of strings of character data to be further partitioned prior to and/or during run-time.

For example, character data 210 may include data strings 330 and 340. Both data strings have a header 230, and in particular, both data strings have a matching header 230 (for clarity a header of 1 in the specific example refers to fixed byte-width ASCII). Therefore, when a concatenation 310 is performed, a mathematical analysis allows the resulting data string 350 to be given a header 230 of 1. Further analysis of the resulting data string 350 is not required due to the logic utilized in concatenation 310. Specifically, in the present example, since both data strings 330 and 340 are shown as fixed-byte width ASCII, then the resulting combination (e.g., data string 350) must also be fixed byte-width ASCII. Therefore, the header 230 may easily be added to show the fixed byte-width characteristic of data string 350. It is appreciated that there are many possible combinations of data string concatenations which may occur, the example described herein is shown merely for purposes of clarity and brevity.

Figure 4:
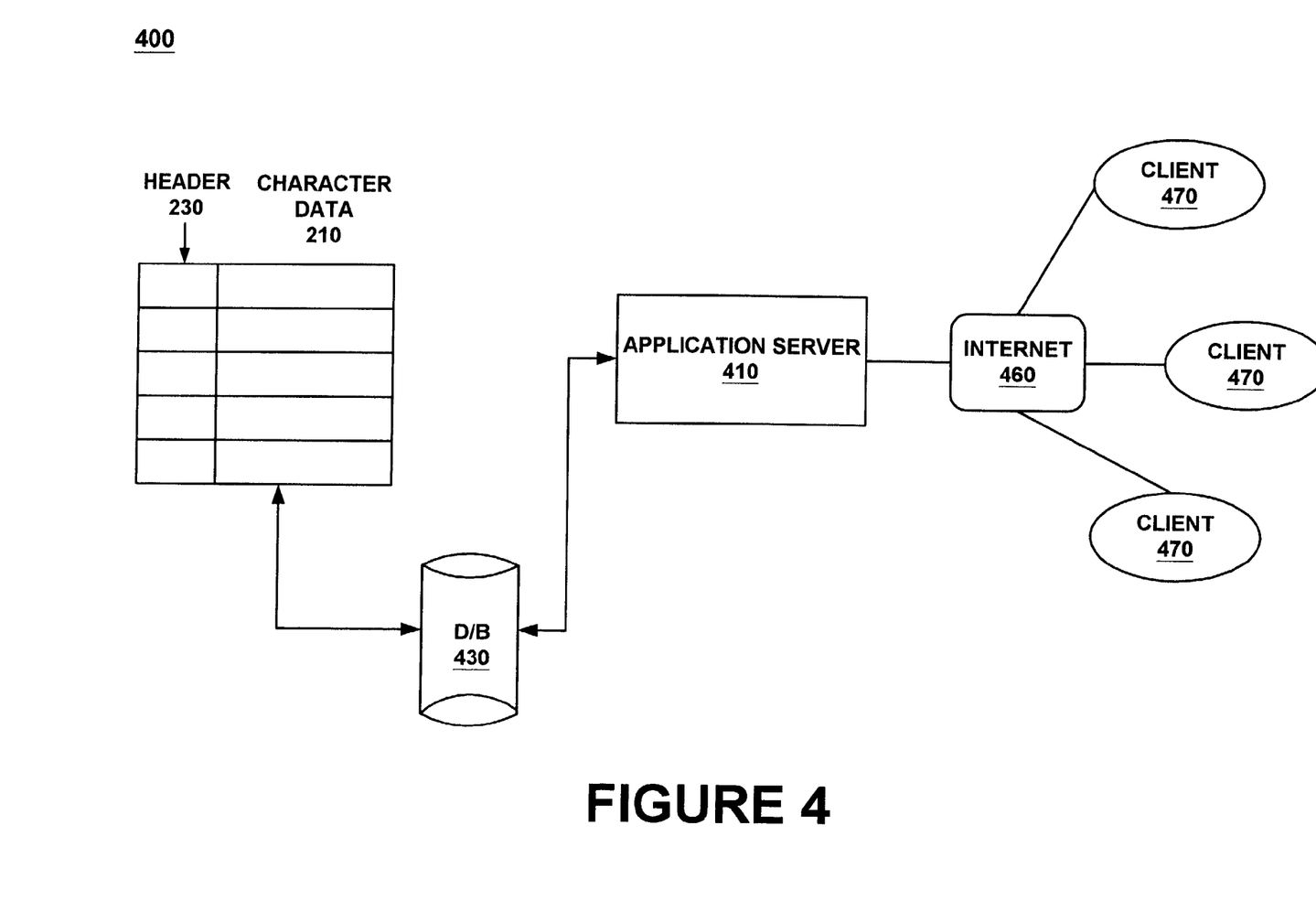
FIG. 4 is a block diagram of an exemplary system in accordance with one embodiment of the present invention for analyzing character data.

With reference now to FIG. 4, a block diagram of an exemplary system 400 is shown in accordance with one embodiment of the present invention for analyzing character data 210. It should be noted that although system 400 is depicted as a number of distinct components (e.g., components 210, 230, and 410–470), embodiments of the present invention are well suited for use on a single device, single database, or a multiplicity of devices and/or databases, such as, for example, the Internet.

Initially, as shown in system 400 a client 470 may access an application server 410. In one embodiment, the access may occur utilizing the Internet 460. Furthermore, client 470 may be a single device, a plurality of devices, a network, a terminal, or the like, which may desire and/or require access to application server 410. Additionally, although an Internet 460 connection is shown as the platform for a client 470 to access application server 410, the platform may be a local area network (LAN), wide area network (WAN), Ethernet, wireless network, or the like which can connect a single user or multiple users to an application server 410. In one embodiment, application server 410 is a computer system such as exemplary computer system 700 of FIG. 7.

Application server 410 may be any type of system that utilizes data strings. For example, application server 410 may utilize an application to search for strings of character data, such as book titles, automobiles, parts, schools, essays, poems, songs, names, addresses, news, inventories, weather, fluids, gases, solids, or the like. In the present embodiment, application server 410 is a global application server that has access to character data 210. In one embodiment, a string engine such as string engine 525 of FIG. 5 may operate on application server 410. Further description of string engine 525 is covered in more detail herein.

Figure 5:
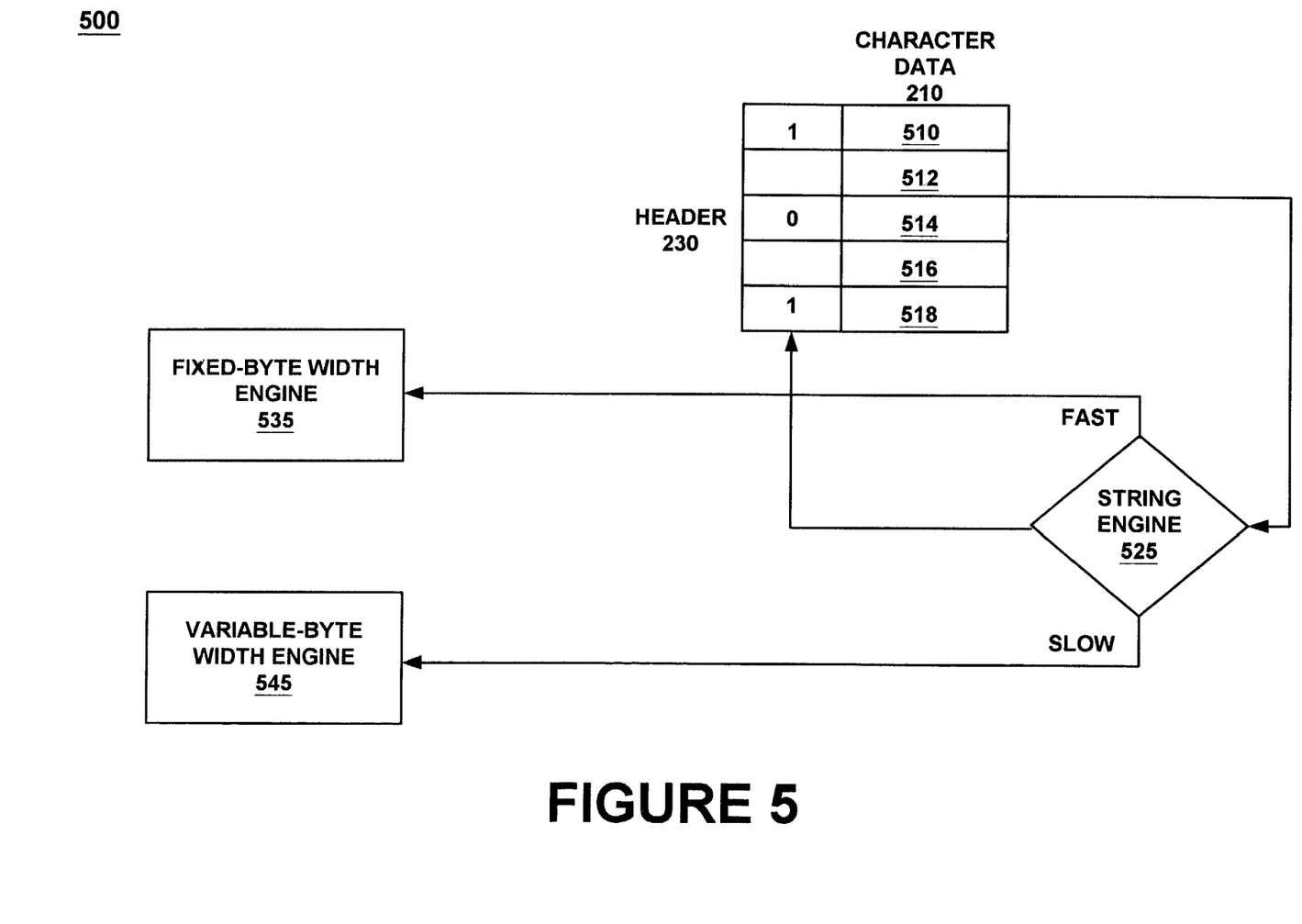
FIG. 5 is a block diagram of an exemplary character data string engine in accordance with one embodiment of the present invention.

With reference now to FIG. 5, a block diagram of an exemplary character data string engine 500 is shown in accordance with one embodiment of the present invention. Character data string engine 500 includes character data 210, string engine 525, fixed byte-width engine 535, and variable byte-width engine 545. As previously stated herein, a data string within character data 210 may contain no byte-width information, some byte-width information, or complete byte-width information.

In one embodiment, string engine 525 determines whether character data 210 should be processed via fixed byte-width engine 535 or variable byte-width engine 545. In order to determine which engine will process the character data 210, string engine 525 may perform a pre-computation compilation to determine the byte-width of a string of character data 210. For example, string engine 525 may access data string 510 and utilize a compiler such as compiler 220 to determine the byte-width of the data string. Upon completion of the analysis, string engine 525 may then return an updated character data string 510 to character data 210 by marking character data string 510 to identify it as either fixed byte-width or variable byte-width.

Furthermore, string engine 525 may return an updated character data string 514 to character data 210 by marking character data string 514 identifying it as either fixed byte-width or variable byte-width after an initial analysis concludes the byte-width of said character data string. In one embodiment, as described herein, the initial analysis may be similar to the analysis performed by character processor 240.

Additionally, string engine 525 may return an updated character data string 518 to character data 210 by marking character data string 518 identifying it as either fixed byte-width or variable byte-width after performing a concatenation of at least two strings of character data 210. In one embodiment, as described herein, the concatenation may be similar to the process describing the actions of concatenation 310.

Referring still to FIG. 5, character data 210, and updates to character data 210, are stored in a database accessible by string engine 525. Additionally, one embodiment for marking the character data strings may add a header 230 to the character data string. In addition to updating character data 210, string engine 525 may direct the data string to a character data-analyzing engine. For example, when character data 210 is being searched for a specific data string, string engine 525 receives a data string such as data string 510. If data string 510 is marked as fixed byte-width, then it is analyzed by fixed byte-width engine 535. However, if data string 510 is marked as variable byte-width or has no marking at all, it will be analyzed by variable byte-width engine 545. Fixed byte-width engine 535 is the desired engine since it is more efficient at character data string analysis than variable byte-width engine 545.

Figure 6:
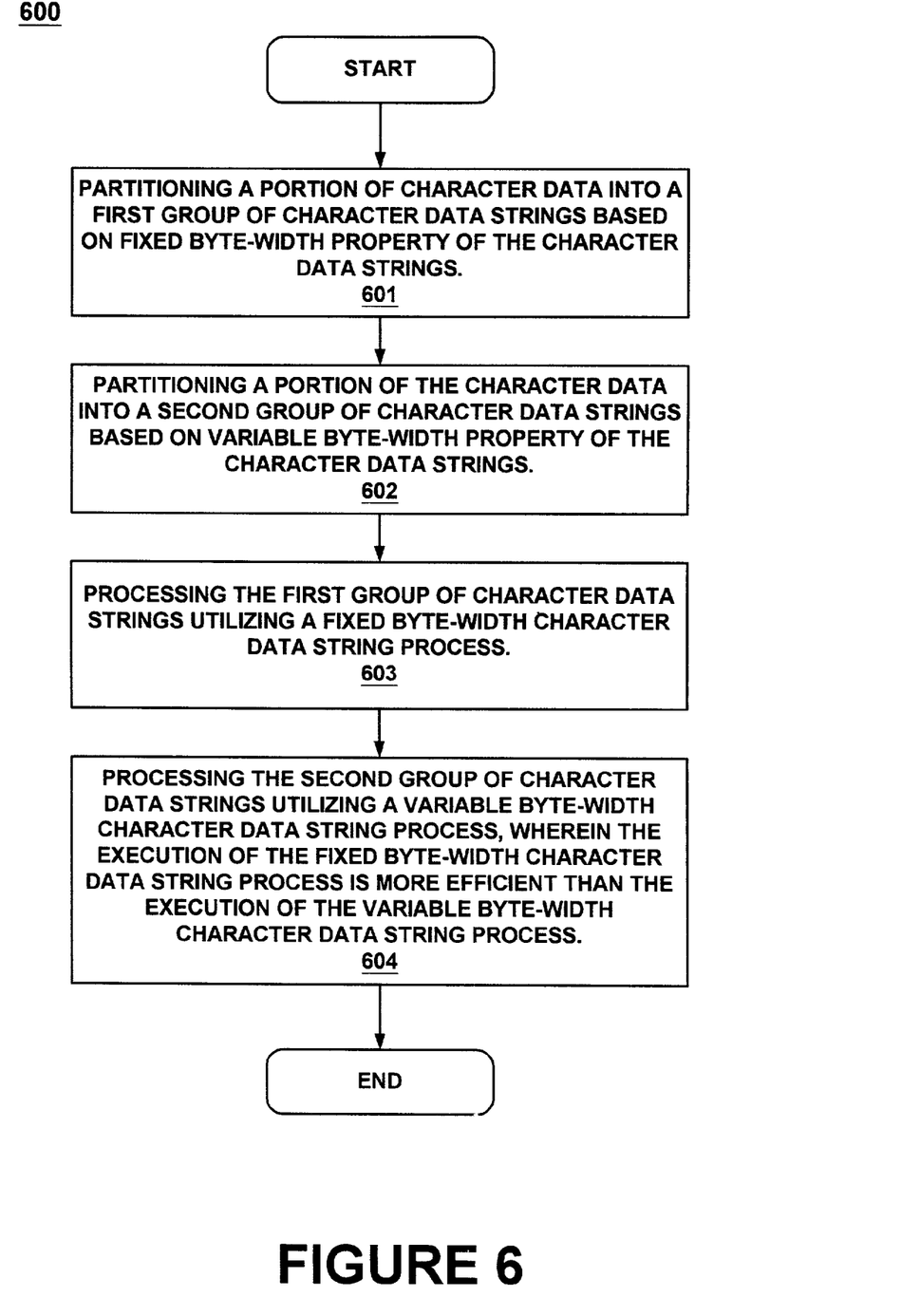
FIG. 6 is a flowchart of steps performed in accordance with one embodiment of the present invention for analyzing character data.

With reference now to FIG. 6, a flowchart of the steps performed for analyzing character data is shown in accordance with one embodiment of the present invention.

Referring now to FIG. 5 and step 601 of FIG. 6, a portion of character data 210 is partitioned into a first group of character data strings based on fixed byte-width properties of the character data strings. As stated herein, the partitioning of character data 210 may be accomplished by performing a pre-computation compilation, a calculation (e.g., character processor 240 of FIG. 2), and/or a concatenation of at least two strings of character data 210. Upon partitioning, the character data strings may be marked to identify them as fixed byte-width data strings. In one embodiment, the marking may comprise attaching a header 230 to the character data string to identify it as a fixed byte-width character data string.

With reference still to FIG. 5 and now to step 602 of FIG. 6, a portion of character data 210 is partitioned into a second group of character data strings based on variable byte-width property of the character data strings. As stated herein, the partitioning of character data 210 may be accomplished by performing a pre-computation compilation, a calculation (e.g., character processor 240 of FIG. 2), and/or a concatenation of at least two strings of character data 210. Upon partitioning, the character data strings may be marking to identify them as variable byte-width data strings. In one embodiment, the marking may comprise attaching a header 230 to the character data string to identify it as a variable byte-width character data string.

With reference still to FIG. 5 and now to step 603 of FIG. 6, in one embodiment the first group of character data strings is processed utilizing a fixed byte-width character data string process (e.g., fixed byte-width engine 535). For example, the fixed byte-width character data string process is performed on the first group in accordance with American standard code for information interchange (ASCII). Although ASCII is shown, the present invention is well suited to using any type of fixed byte-width language for analysis (e.g., WE8DEC UTF8 (8 bit), UTF16 (16 bit), UTF32 (32 bit), etc.). The use of ASCII in the present embodiment is merely for purposes of brevity and clarity.

With reference still to FIG. 5 and now to step 604 of FIG. 6, in one embodiment the second group of character data strings is processed utilizing a variable byte-width character data string process (e.g., variable byte-width engine 545). For example, the variable byte-width character data string process is performed on the second group in accordance with worldwide committee (Unicode) standard. However, it is appreciated that the execution of the fixed byte-width character data string process is more efficient than the execution of the variable byte-width character data string process.

Figure 7:
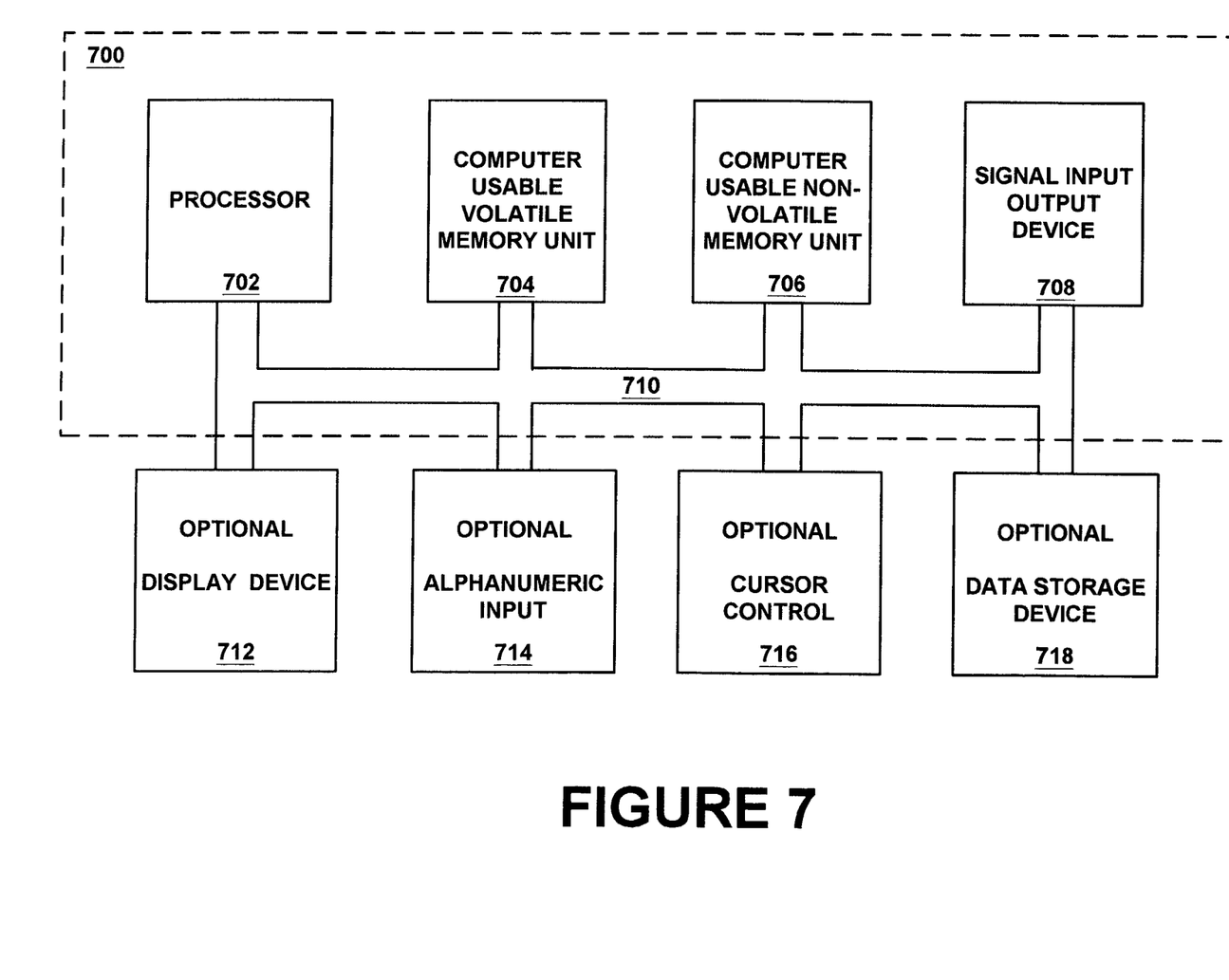
FIG. 7 is a block diagram of an embodiment of an exemplary computer system used in accordance with the present invention.

With reference now to FIG. 7, a block diagram of an embodiment of an exemplary computer system 700 used in accordance with the present invention. It should be appreciated that system 700 is not strictly limited to be a computer system. As such, system 700 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of computer system 700 and executed by a processor(s) of system 700. When executed, the instructions cause computer 700 to perform specific actions and exhibit specific behavior that is described in detail herein.

Computer system 700 of FIG. 7 comprises an address/data bus 710 for communicating information, one or more central processors 702 coupled with bus 710 for processing information and instructions. Central processor unit(s) 702 may be a microprocessor or any other type of processor. The computer 700 also includes data storage features such as a computer usable volatile memory unit 704 (e.g., random access memory, static RAM, dynamic RAM, etc.) coupled with bus 710 for storing information and instructions for central processor(s) 702, a computer usable non-volatile memory unit 706 (e.g., read only memory, programmable ROM, flash memory, EPROM, EEPROM, etc.) coupled with bus 710 for storing static information and instructions for processor(s) 702. System 700 also includes one or more signal generating and receiving devices 708 coupled with bus 710 for enabling system 700 to interface with other electronic devices and computer systems. The communication interface(s) 708 of the present embodiment may include wired and/or wireless communication technology. For example, within the present embodiment, the communication interface 708 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

Optionally, computer system 700 may include an alphanumeric input device 714 including alphanumeric and function keys coupled to the bus 710 for communicating information and command selections to the central processor(s) 702. The computer 700 can include an optional cursor control or cursor directing device 716 coupled to the bus 710 for communicating user input information and command selections to the central processor(s) 702. The cursor-directing device 716 may be implemented using a number of well known devices such as a mouse, a track-ball, a track-pad, an optical tracking device, a touch screen, among others. Alternatively, it is appreciated that a cursor may be directed and/or activated via input from the alphanumeric input device 714 using special keys and key sequence commands. The present embodiment is also well suited to directing a cursor by other means such as, for example, voice commands.

The system 700 of FIG. 7 may also include one or more optional computer usable data storage devices 718 such as a magnetic or optical disk and disk drive (e.g., hard drive or floppy diskette) coupled with bus 710 for storing information and instructions. An optional display device 712 is coupled to bus 710 of system 700 for displaying video and/or graphics. It should be appreciated that optional display device 712 may be a cathode ray tube (CRT), flat panel liquid crystal display (LCD), field emission display (FED), plasma display or any other display device suitable for displaying video and/or graphic images and alphanumeric characters recognizable to a user.

Thus, the present invention provides, in various embodiments, a method and system for analyzing character data. Furthermore, the present invention provides a method and system for analyzing character data and partitions the character data string into either single-byte character data string or multi-byte data. Additionally, the present invention provides a method and system for analyzing character data faster and less expensively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for analyzing character data comprising:
 accessing said character data comprising a first group and a second group of memory stored character data strings;
 partitioning a portion of said character data into said first group of memory stored character data strings, said partitioning into said first group based on a fixed byte-width property of said character data strings;
 partitioning a portion of said character data into said second group of memory stored character data strings, said partitioning into said second group based on a variable byte-width property of said character data strings;
 searching through said first group of character data strings for a prescribed string utilizing a fixed byte-width character data string process; and
 searching through said second group of character data strings for a prescribed string utilizing a variable byte-width character data string process, wherein the execution of said fixed byte-width character data string process is more efficient than the execution of said variable byte-width character data string process.

2. The method as recited in claim 1 wherein said partitioning of said character data further comprises:
 performing a pre-computation compilation to determine a byte-width of a string of said character data; and
 marking said character data string to identify said character data string as either fixed byte-width or variable byte-width.

3. The method as recited in claim 2 wherein said marking comprises:
 attaching a header to said character data string to identify said character data string as either fixed byte-width or variable byte-width.

4. The method as recited in claim 1 wherein said partitioning of said character data further comprises:
 performing a calculation to determine a byte-width of a string of said character data; and
 marking said character data string to identify said character data string as either fixed byte-width or variable byte-width based on the result of said calculation.

5. The method as recited in claim 1 wherein said partitioning of said character data further comprises:
 performing a concatenation of at least two strings of said character data; and
 marking said character data string to identify said character data string as either fixed byte-width or variable byte-width based on the result of said concatenation.

6. The method as recited in claim 1 wherein said fixed byte-width character data string process is performed on said first group in accordance with American standard code for information interchange (ASCII).

7. The method as recited in claim 1 wherein said variable byte-width character data string process is performed on said second group in accordance with worldwide committee (Unicode consortium) standard.

8. A computer system comprising:
 a bus;
 a memory unit coupled with said bus; and
 a processor coupled with said bus, said processor for executing a method for analyzing character data comprising:

accessing said character data comprising a first group and a second group of memory stored character data strings;

partitioning a portion of said character data into said first group of memory stored character data strings, said partitioning into said first group based on a fixed byte-width property of said character data strings;

partitioning a portion of said character data into said second group of memory stored character data strings, said partitioning into said second group based on a variable byte-width property of said character data strings;

searching through said first group of character data strings for a prescribed string utilizing a fixed byte-width character data string process; and searching through said second group of character data strings for a prescribed string utilizing a variable byte-width character data string process, wherein the execution of said fixed byte-width character data string process is more efficient than the execution of said variable byte-width character data string process.

9. The computer system of claim 8 wherein said partitioning of said character data further comprises:
performing a pre-computation compilation to determine a byte-width of a string of said character data; and
marking said character data string to identify said character data string as either fixed byte-width or variable byte-width.

10. The computer system of claim 8 wherein said marking comprises:
attaching a header to said character data string to identify said character data string as either fixed byte-width or variable byte-width.

11. The computer system of claim 8 wherein said partitioning of said character data further comprises:
performing a calculation to determine a byte-width of a string of said character data; and
marking said character data string to identify said character data string as either fixed byte-width or variable byte-width based on the result of said calculation.

12. The computer system of claim 8 wherein said partitioning of said character data further comprises:
performing a concatenation of at least two strings of said character data; and
marking said character data string to identify said character data string as either fixed byte-width or variable byte-width based on the result of said concatenation.

13. The computer system of claim 8 wherein said fixed byte-width character data string process is performed on said first group in accordance with American standard code for information interchange (ASCII).

14. The computer system of claim 8 wherein said variable byte-width character data string process is performed on said second group in accordance with worldwide committee (Unicode consortium) standard.

15. A computer-usable medium having computer-readable program code embodied therein for causing a computer system to perform a method for analyzing character data, said method comprising:
accessing said character data comprising a first group and a second group of memory stored character data strings;
partitioning a portion of said character data into said first group of memory stored character data strings, said partitioning into said first group based on fixed byte-width property of said character data strings;
partitioning a portion of said character data into said second group of memory stored character data strings, said partitioning into said second group based on a variable byte-width property of said character data strings;
searching through said first group of character data strings for a prescribed string utilizing a fixed byte-width character data string process; and
searching through said second group of character data strings for a prescribed string utilizing a variable byte-width character data string process, wherein the execution of said fixed byte-width character data string process is more efficient than the execution of said variable byte-width character data string process.

16. The computer-usable medium of claim 15 wherein said partitioning of said character data further comprises:
performing a pre-computation compilation to determine a byte-width of a string of said character data; and
marking said character data string to identify said character data string as either fixed byte-width or variable byte-width.

17. The computer-usable medium of claim 16 wherein said marking comprises:
attaching a header to said character data string to identify said character data string as either fixed byte-width or variable byte-width.

18. The computer-usable medium of claim 15 wherein said partitioning of said character data further comprises:
performing a calculation to determine a byte-width of a string of said character data; and
marking said character data string to identify said character data string as either fixed byte-width or variable byte-width based on the result of said calculation.

19. The computer-usable medium of claim 15 wherein said partitioning of said character data further comprises:
performing a concatenation of at least two strings of said character data; and
marking said character data string to identify said character data string as either fixed byte-width or variable byte-width based on the result of said concatenation.

20. The computer-usable medium of claim 15 wherein said fixed byte-width character data string process is performed on said first group in accordance with American standard code for information interchange (ASCII).

21. The computer-usable medium of claim 15 wherein said variable byte-width character data string process is performed on said second group in accordance with worldwide committee (Unicode consortium) standard.

22. A character data string engine comprising:
character data comprising a fixed byte-width and a variable byte-width of memory stored character data strings;
a fixed byte-width engine for searching through said fixed byte-width memory stored character data strings;
a variable byte-width engine for processing said fixed byte-width memory stored character data strings; and
a string engine, wherein said string engine is capable of partitioning said character data into said fixed byte-width memory stored character data strings and said variable byte-width memory stored character data strings, and wherein said string engine determines whether said character data is searched through via said fixed byte-width engine for a prescribed string or said character data is searched through via said variable byte-width engine for a prescribed string, and wherein the execution of said fixed byte-width character data string process is more efficient than the execution of said variable byte-width character data string process.

23. The character data string engine of claim 22 wherein said string engine performs a pre-computation compilation to determine a byte-width of a string of said character data.

24. The character data string engine of claim 23 wherein said string engine returns an updated character data string to said character data by marking said character data string identifying said character data string as either fixed byte-width or variable byte-width.

25. The character data string engine of claim 22 wherein said string engine returns an updated character data string to said character data by marking said character data string identifying said character data string as either fixed byte-width or variable byte-width after an initial analysis concludes the byte-width of said character data string.

26. The character data string engine of claim 22 wherein said string engine returns an updated character data string to said character data by marking said character data string identifying said character data string as either fixed byte-width or variable byte-width after performing a concatenation of at least two strings of said character data.

27. The character data string engine of claim 22 wherein said character data and updates to said character data are stored in a database accessible by said string engine.

28. The character data string engine of claim 22 wherein said fixed byte-width engine is more efficient than said variable byte-width engine.

* * * * *

UNITED STATES PATENT AND TRADEMARK OFFICE
CERTIFICATE OF CORRECTION

| | | |
|---|---|---|
| PATENT NO. | : 7,219,088 B1 | Page 1 of 1 |
| APPLICATION NO. | : 10/158174 | |
| DATED | : May 15, 2007 | |
| INVENTOR(S) | : Li | |

It is certified that error appears in the above-identified patent and that said Letters Patent is hereby corrected as shown below:

In column 6, line 31, delete "fixed-byte width" and insert -- fixed byte-width --, therefor.

Signed and Sealed this

Twenty-third Day of March, 2010

David J. Kappos
*Director of the United States Patent and Trademark Office*